(12) United States Patent
Miller et al.

(10) Patent No.: US 11,430,243 B2
(45) Date of Patent: Aug. 30, 2022

(54) SYSTEMS AND METHODS OF PROCESSING UNDELIVERABLE DELIVERY ITEMS

(71) Applicant: United States Postal Service, Washington, DC (US)

(72) Inventors: Derek Miller, Alexandria, VA (US); Thomas J. Graham, Chantilly, VA (US)

(73) Assignee: UNITED STATES POSTAL SERVICE, Washington, DC (US)

(*) Notice: Subject to any disclaimer, the term of this patent is extended or adjusted under 35 U.S.C. 154(b) by 0 days.

(21) Appl. No.: 16/847,269

(22) Filed: Apr. 13, 2020

(65) Prior Publication Data

US 2020/0334455 A1 Oct. 22, 2020

Related U.S. Application Data

(60) Provisional application No. 62/834,691, filed on Apr. 16, 2019.

(51) Int. Cl.
*G06K 9/00* (2022.01)
*G06V 30/416* (2022.01)
(Continued)

(52) U.S. Cl.
CPC ............ *G06V 30/416* (2022.01); *G06F 3/12* (2013.01); *G06V 10/40* (2022.01); *G08B 5/22* (2013.01); *H04N 5/2253* (2013.01); *H04N 5/232* (2013.01); *B07C 3/00* (2013.01); *G06V 30/10* (2022.01)

(58) Field of Classification Search
None
See application file for complete search history.

(56) References Cited

U.S. PATENT DOCUMENTS 8,598,482 B2 12/2013 Bonnell et al.
8,905,304 B1 * 12/2014 Daniel ............ G06Q 20/40145
235/380

(Continued)

OTHER PUBLICATIONS

Johnson, Mark R. et al., "Undeliverable as Addressed Mail Process," Powerpoint dated Apr. 20, 2017 presented to the Puget Sound Postal Customer Counsel, pp. 1-29.

(Continued)

*Primary Examiner* — Oneal R Mistry
(74) *Attorney, Agent, or Firm* — MH2 Technology Law Group, LLP (57) ABSTRACT

Provided herein are processing systems including a camera that is arranged to capture an image of a delivery item. The system also includes a hardware processor that is operably connected to the camera and that is configured to perform operations that include capturing, using the camera, an image of a delivery item that is undeliverable to an intended recipient or at an intended delivery location, where the image includes an address of the intended recipient. The operations also include embedding, by the hardware processor, processing data with the image of the delivery item to thereby generate an embedded image, and notifying a sender of the delivery item that the delivery item is undeliverable using the embedded image. Also provided herein are related computer readable media and methods of processing delivery items that are undeliverable.

18 Claims, 8 Drawing Sheets

(51) Int. Cl.
*H04N 5/232* (2006.01)
*G06F 3/12* (2006.01)
*G08B 5/22* (2006.01)
*H04N 5/225* (2006.01)
*G06V 10/40* (2022.01)
*B07C 3/00* (2006.01)
*G06V 30/10* (2022.01)

(56) References Cited

U.S. PATENT DOCUMENTS

| | | | | |
|---|---|---|---|---|
| 10,643,113 | B2* | 5/2020 | Cousins | G06K 9/00463 |
| 2002/0165729 | A1* | 11/2002 | Kuebert | G06Q 10/083 |
| | | | | 705/338 |
| 2003/0182017 | A1* | 9/2003 | O'Donohue | B07C 3/14 |
| | | | | 700/224 |
| 2013/0299578 | A1* | 11/2013 | Ahmed | B07C 7/005 |
| | | | | 235/385 |
| 2014/0374478 | A1* | 12/2014 | Dearing | G06K 7/1417 |
| | | | | 235/385 |
| 2014/0375462 | A1* | 12/2014 | Biondo | G08B 21/02 |
| | | | | 340/576 |
| 2017/0243038 | A1* | 8/2017 | Bowers | G06K 7/1413 |
| 2018/0089526 | A1* | 3/2018 | Walsh | G06K 9/46 |
| 2018/0089623 | A1* | 3/2018 | Walsh | G06V 30/414 |
| 2019/0279325 | A1* | 9/2019 | Blohm | G06K 9/325 |
| 2021/0336840 | A1* | 10/2021 | Belmonte | G06V 30/416 |

OTHER PUBLICATIONS

Fisher, Kai, "Undeliverable as Addressed Mail Process FLow," Powerpoint dated May 7, 2018 presented at the 2018 National Postal Forum, San Antonio TX, pp. 1-21.

* cited by examiner

SYSTEMS AND METHODS OF PROCESSING UNDELIVERABLE DELIVERY ITEMS

CROSS-REFERENCE TO RELATED APPLICATIONS

This application claims the benefit of, and priority to, U.S. Provisional Patent Application No. 62/834,691 filed on 16 Apr. 2019, the entire contents of which is hereby incorporated by reference in its entirety.

BACKGROUND

Note that, herein, the term "mail" may sometimes be employed interchangeably with "delivery item" or "delivery package"; as used herein, "mail" may also refer in an exemplary sense to U.S. Postal Mail, and may also refer generically to delivery items delivered by any delivery service, government or private, including for example and without limitation the United States Postal Service (USPS), the United Parcel Service (UPS) Corporation, and Federal Express (FedEx) Corporation. The terms "tangible mail," "item of tangible mail," "delivery item," "tangible item," "delivery package", "package," and simply "item" are used interchangeably herein, referring generically to deliverable printed matter, packages, and packaged materials transported by delivery services (government or private).

Delivery of tangible items generally entails placing an item in some manner of box, wrapping, or container, and placing on the exterior of the container one or more labels or delivery indicia. The indicia typically indicate a sender and a recipient, and often indicates transport costs such as postage. A tangible item, suitably wrapped and labeled, or otherwise prepared for transport by a delivery service, may be referred to herein as a "delivery item" or "package" or "parcel" or as "mail."

Delivery items may include parcels or packages or flats, such as magazines, or may include letters contained in envelopes; when transported by the USPS, such letters, flats and parcels are conventionally referred to as "mail." It will be understood herein, however, that "mail" is used as a generic term referring to letters and such which are transported by non-governmental delivery services, such as UPS and FedEx, and others.

Delivery items may also include packages and parcels. For purposes of this document, the term "delivery items" may also refer to bound bundles or to trays which are used to deliberately assemble and transport multiple individual letters, documents, small boxes, etc., as a group, at least as an interim aspect of transport.

With most delivery services, such as USPS, UPS, and FedEx, the process of delivering multiple delivery items to various recipients involves sorting the delivery items to ensure the items are carried (by trucks, airplanes, persons, etc.) along appropriate delivery routes. Handing of the delivery items occurs at delivery service processing/sorting facilities, which are typically physical buildings with suitable interior equipment and infrastructure to process delivery items. Among other elements, the processing/sorting facilities may employ extended conveyor systems to internally route and distribute delivery items along various transport paths. In some cases, within a processing/sorting facility, some delivery items, such as letters or mail, may be transported along, at least in part, in groups or bundles, for example held in trays which travel on the conveyor systems. These conveyor systems, including suitable sensors to read delivery item indicia and tray labels, and mechanical elements to distribute and route delivery items, may be referred to as Sorting and Material Handling (SMH) systems.

Many delivery items cannot be delivered to the person and/or place to which they are addressed, for example, because the person does not live at the address, the person has moved to a different address, the address is incorrect (e.g., the house number or street name is wrong), the name or address is illegible, etc. The USPS, for example, annually processes approximately five billion delivery items that cannot be delivered as addressed. This mail is classified as undeliverable-as-addressed (UAA) mail. The handling procedures involved with this type of mail include forwarding, returning to sender, or disposing of the delivery item as waste mail. Certain types of UAA mail are typically processed through Computerized Forwarding System (CFS) sites and by the various delivery units.

In certain instances, a mailer or sender of a delivery item has not subscribed to an address correction service provided by the delivery service, such as the USPS, and instead uses an on-item instruction, such as an ancillary service endorsement, which instructs the delivery service how to handle its UAA items. The handling typically includes the mailing service notifying the mailer that a mail piece was UAA by sending the mailer a conventional hard copy notification (HCN) and/or by returning the mail piece to the mailer.

A conventional HCN is a handmade paper photocopy of, for example, the UAA mail piece in the cutout portion of a paper or cardstock template. To make the conventional HCN, an employee must leave their workstation with the UAA mail piece, select the appropriate cardstock template for that mail piece, (e.g., the template that is printed with the appropriate information corresponding to the endorsement on the mail piece), place the template on the glass of the copy machine, position the UAA mail piece on the glass in the middle of the cutout in the template, make the photocopy, which is the HCN, return the cardstock template to its storage location, and then return to their workstation with the UAA mail piece and the HCN.

The completed conventional HCN is then mailed to the sender to inform the sender that the address is invalid. Depending on the template used and the text on the UAA mail piece, (e.g., on a yellow change-of-address or undeliverable-as-addressed "nixie" label attached to it), the HCN photocopy may include text or other information indicating the addressee's new address and/or the reason why the mail piece could not be delivered.

In recent years, the volume of such conventional HCNs processed by the USPS alone has exceeded five million mail pieces and consumed large amounts of employee work hours. Accordingly, what is desirable, then, are systems, devices, and related methods to supplement, complement, make more efficient, or enhance the handling of undeliverable mail and related notification processes.

SUMMARY

This application discloses systems, computer-readable media, and related methods for processing undeliverable delivery items, including related notification processes. In one aspect, for example, this disclosure provides a processing system that includes a camera that is arranged to capture an image of a delivery item and a hardware processor that is operably connected to the camera. The hardware processor is configured to perform operations comprising: capturing, using the camera, an image of a delivery item that is undeliverable to an intended recipient or at an intended delivery location, where the image includes an address of the intended recipient; embedding, by the hardware processor, processing data with the image of the delivery item to thereby generate an embedded image; and notifying a sender of the delivery item that the delivery item is undeliverable using the embedded image.

In certain embodiments, capturing, using the camera, the image of the delivery item that is undeliverable comprises activating the camera after the delivery item is manually positioned to face the camera. In some embodiments, notifying the sender of the delivery item that the delivery item is undeliverable comprises electronically transmitting the embedded image to the sender. In certain embodiments, the processing system further includes a printer that is operably connected to the hardware processor. In these embodiments, the operations typically further include printing, by the printer, the embedded image to generate a printed embedded image. Optionally, notifying the sender of the delivery item that the delivery item is undeliverable sending the printed embedded image to the sender. In some embodiments, the processing data comprises temporary delivery location information or updated delivery location information. In certain of these embodiments, the operations further comprise receiving payment from the sender to send the delivery item to the temporary delivery location or to the updated delivery location.

In another aspect, this disclosure provides a computer-readable, non-transitory storage medium storing instructions that, when executed by a hardware processor of a computing system, cause the hardware processor to execute a method of processing a delivery item. The method comprises capturing an image of a delivery item received from a camera that is operably connected to the computing system. The delivery item is undeliverable to an intended recipient or at an intended delivery location, where the image includes an address of the intended recipient. The method also comprises embedding, by the hardware processor, processing data with the image of the delivery item to thereby generate an embedded image. In addition, the method also includes notifying a sender of the delivery item that the delivery item is undeliverable using the embedded image.

In certain embodiments, capturing the image of the delivery item received from the camera comprises activating the camera after the delivery item is manually positioned to face the camera. In some embodiments, the method further comprises printing the embedded image via a printer that is operably connected to the hardware processor to generate a printed embedded image. In certain of these embodiments, notifying the sender of the delivery item further comprises sending the printed embedded image to the sender to thereby notify the sender that the delivery item is undeliverable. In some embodiments, notifying the sender of the delivery item that the delivery item is undeliverable comprises electronically transmitting the embedded image to the sender. In certain of these embodiments, the processing data comprises temporary delivery location information or updated delivery location information. Optionally, the method further comprises receiving payment from the sender to send the delivery item to the temporary delivery location or to the updated delivery location.

In yet another aspect, the disclosure provides a method of processing a delivery item using a processing station comprising a computer and a camera that is operably connected to the computer. The method comprises capturing an image of the delivery item with the camera. The delivery item is undeliverable to an intended recipient or at an intended delivery location. The method also includes embedding, by the computer, processing data with the image of the delivery item to thereby generate an embedded image; notifying a sender of the delivery item that the delivery item is undeliverable using the embedded image; and directing the delivery item to an alternative location other than the intended delivery location.

In certain embodiments, capturing the image of the delivery item with the camera comprises activating the camera after the delivery item is manually positioned to face the camera. In some embodiments, the method further includes identifying that the delivery item is undeliverable as addressed. In certain embodiments, the method includes identifying the undeliverable status of the delivery item. Optionally, identifying that the delivery item is undeliverable as addressed comprises determining that the image of the delivery item includes erroneous information about the intended recipient or the intended delivery location. In certain of these embodiments, the method further comprises printing the embedded image to thereby generate a printed embedded image. In some of these embodiments, the method includes notifying the sender of the delivery item that the delivery item is undeliverable comprises sending the printed embedded image to the sender.

In certain embodiments, the alternative location comprises a location from a group consisting of: a waste location, a temporary delivery location, or an updated delivery location. In certain of these embodiments, the method also includes notifying the sender of the temporary delivery location or the updated delivery location. In some of these embodiments, the method further includes receiving payment from the sender to send the delivery item to the temporary delivery location or to the updated delivery location.

The foregoing illustrative summary, as well as other exemplary objectives and/or advantages of this disclosure, and the manner in which the same are accomplished, as well as additional or alternative features or embodiments, are further explained within the following detailed description and its accompanying drawings.

DETAILED DESCRIPTION

In the following description, certain specific details are set forth in order to provide a thorough understanding of various embodiments. However, one skilled in the art will understand that the invention may be practiced without these details. In other instances, well-known structures associated with computers or with robotic systems, conveyor systems, cameras, photo-detection, wired or wireless communications, with other digital devices, with data display, and/or with data storage or data transmission, have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open sense, that is, as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret or limit the scope or meaning of the claimed invention.

Reference Numbers: Reference numbers are used throughout the figures, and the first digit of a reference number generally indicates the first drawing where the associated element appears. For example, an element 206 first appears in FIG. 2.

Terms

Hard Copy Notification System: Herein, the present system and method may be characterized at points in terms of a representative or exemplary system being developed by the United States Postal Service (USPS), and referred to as the USPS mail Undeliverable-As-Addressed (UAA) processing system or Hard Copy Notification (HCN) system.

It will be understood, however, that this system, as well as the term Undeliverable-As-Addressed processing system and the acronym "UAA processing system" or Hard Copy Notification system and the acronym "HCN system" refer to an exemplary embodiment only. The present system and method encompasses other processing systems as yet undeveloped or to be developed, which employ substantially the same elements and/or method steps, which may be designed or developed by parties other than the USPS, and which may be referred to by terms other than Undeliverable-As-Addressed processing system, UAA processing system, Hard Copy Notification system, HCN system, or the like.

Delivery Item: As used in this document, a delivery item or tangible delivery item generally refers to a portable, usually hand-deliverable physical item with a container or wrapper around it, the container or wrapper having imprinted on it or on a label (or otherwise conveying) necessary information (e.g., name and address) for conveyance of the physical item from a sender to a recipient. In some instances the exterior wrapping may be omitted, as for example with a postcard or a brochure with suitable tape to close the brochure, where the card or sealed brochure itself is the physical item and has suitable labeling directly imprinted or attached.

The physical item may include for example and without limitation paper or papers, printed matter, or various tangible products or items to be physically transported from an item sender to an item recipient via an item delivery service, often entailing hand transport and delivery along at least part of the route. For example without limitation, any of a parcel, a package, a letter, a document, a magazine, a brochure, a pamphlet, a book, a cell phone, a child's toy, or a diamond ring, suitably contained or wrapped and labeled for transport, would all be examples of delivery items.

The term delivery item, also typically encompasses printed matter or other indicia (for example, postal stamps of the U.S. Post Office or other national postal services, or bar codes employed by both postal services and private delivery companies) which may indicate, among other elements, payment of tangible item transport costs.

Delivery Service: A delivery service is any organization, governmental or private, which transports tangible items from a specific sender to a specified recipient. Such delivery services include for example and without limitation the U.S. Postal Service, other national postal services, UPS, and FedEx, as already enumerated above. Any references herein to the United States Postal Service will therefore be understood as exemplary only, and not limiting.

Methods and Systems to Process UAA

A delivery item, such as mail, that cannot be delivered as addressed is typically classified as undeliverable-as-addressed (UAA). A sender or mailer can request to receive address corrections for any UAA mail pieces using, for example, a mail barcode. Additional details regarding UAA and barcodes that are optionally adapted for use with the methods and systems of the present disclosure are described, for example, in U.S. Pat. No. 8,598,482, which is incorporated by reference in its entirety for all purposes. In addition, mailers (the sender of the mail piece) can also instruct the mailing service regarding how it wants its UAA mail pieces to be handled. For example, the mailer can indicate that any UAA mail pieces should be forwarded to the addressee's new address (if possible), returned to the sender, or treated as waste and disposed of by the mailing service.

In certain embodiments, different delivery classes, e.g., mail classes, have different "default" treatments for UAA mail, which may be implemented when there are instructions from the mailer. Within the First-Class Mail class, for example, the "default" treatment for a mail piece that cannot be delivered is for the mail piece to be either forwarded or returned to the mailer ("return to sender"). In the Periodicals class, the "default" treatment of UAA mail is to forward mail pieces for the first 60 calendar days following an addressee's move date and dispose of all other UAA mail pieces as waste. For Standard Mail and Bound Printed Matter, which are low-cost classes, the "default" treatment of UAA mail is to dispose of the mail piece as waste.

Mailers can instruct the mailing service to handle UAA mail pieces in a manner different than the default treatment provided for the class of mail. For example, First-Class Mail mailers can tell the mailing service to dispose of UAA mail pieces rather than forwarding or returning the mail pieces. Standard Mail mailers can indicate their desire to have UAA mail that can be forwarded sent to the addressee's new address and all other UAA mail disposed of as waste.

In one embodiment, a sender instructs the delivery service of its intent to have its UAA items treated in a manner different than the default treatment by providing instructions on the item, e.g., a USPS ancillary service endorsement, that describes how to handle any UAA delivery items. In the ancillary service endorsement example, the endorsements consist of one string, e.g.: "Electronic," "Address," "Return," "Change," "Temp-Return" or "Forwarding," followed by the two words "Service Requested." In some embodiments, the mailer attaches or prints the ancillary service endorsement on a mail piece and the mailing service recognizes the ancillary service endorsement when it processes UAA mail.

Figure 4:
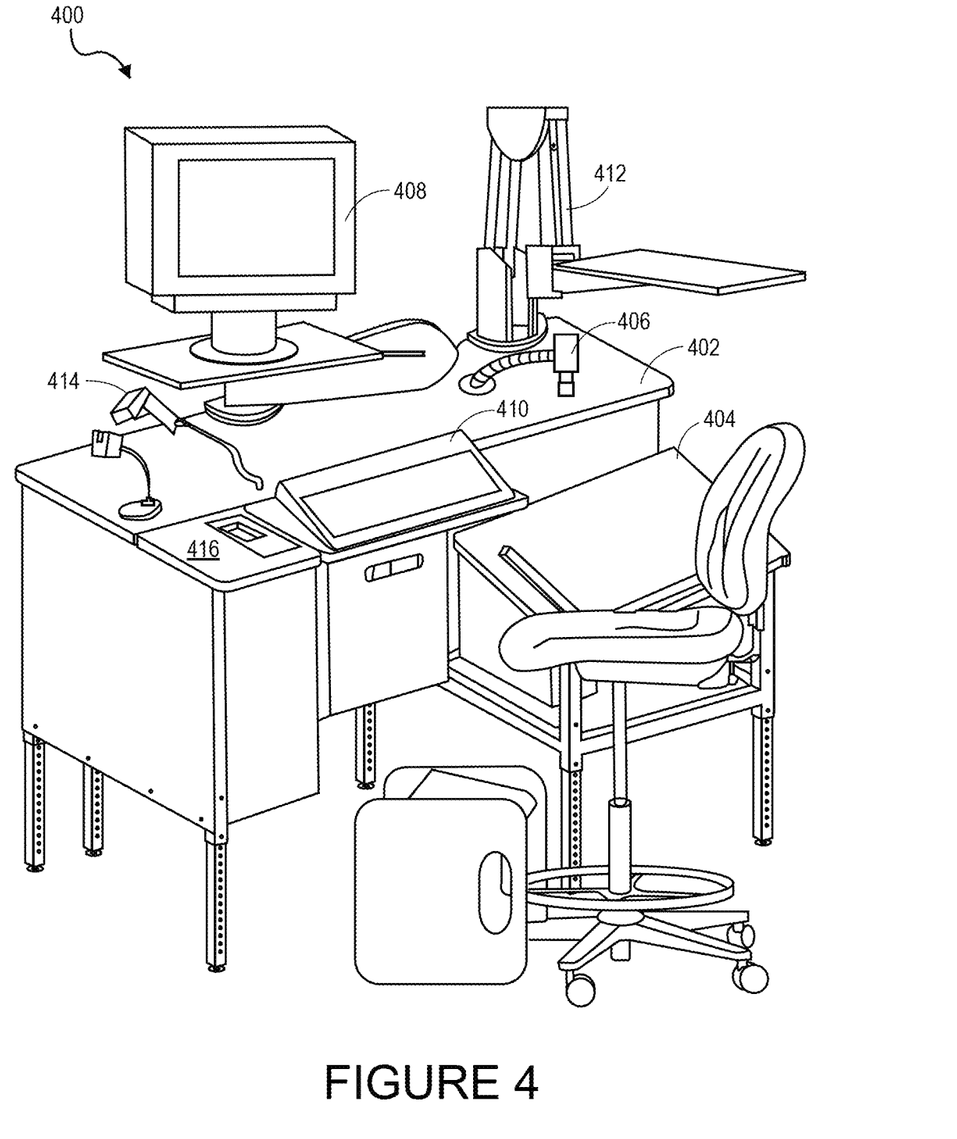
FIG. 4 depicts an example of a flats forwarding terminal (FFT) assembly that includes a camera to capture images of undeliverable delivery items according to one exemplary embodiment.

In some instances, a mailer has not subscribed to an electronic address correction service provided by the mailing service, which provides electronic notifications regarding UAA items, yet uses an ancillary service endorsement related to UAA items on its mail pieces, such as "Change Service Requested." In such instances, embodiments consistent with the present disclosure provide a system, (e.g., a flats forwarding terminal assembly as shown in FIG. 4), that automatically creates an image of the UAA item such that the image is embedded with UAA information or processing data that apprises the mailer regarding the UAA item. In various embodiments, embedded image may include a form of information that can be printed out and physically sent to the mailer in order to notify the mailer that a mail piece was UAA.

Figure 1A:
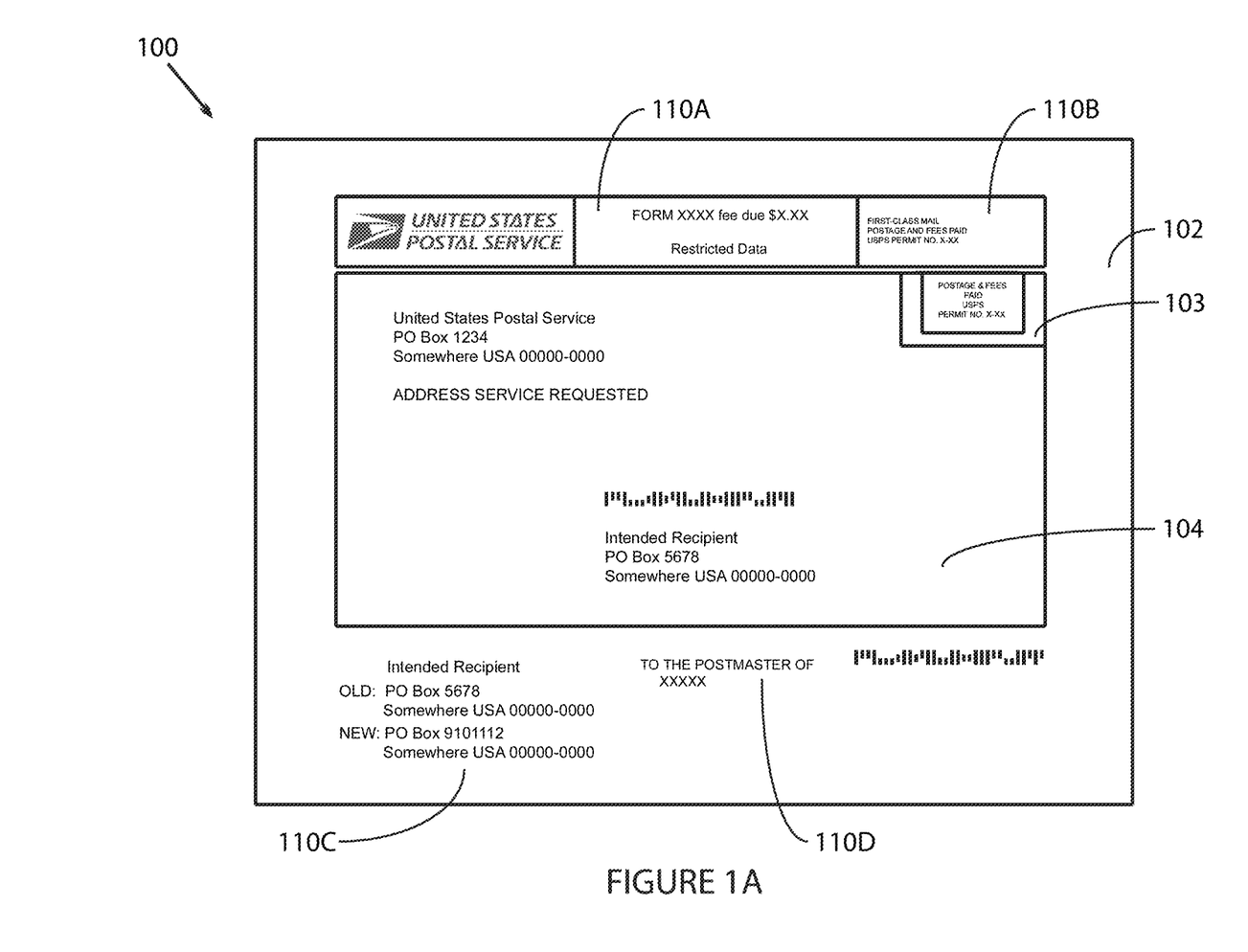
FIG. 1A is an illustration of an example of an embedded image for notifying a sender regarding a UAA delivery item (shown as a letter) that is to be sent to a forwarding address, according to one exemplary embodiment.

More particularly, as shown in the illustration of an example of an embedded image 100 for notifying a sender regarding a UAA delivery item in FIG. 1A intended for forwarding, the embedded image 100 may include an image (e.g., a digital photo) of the UAA mail piece 104 (shown as a letter) and processing data 110 for the mailer regarding the UAA mail piece. In the printed-out example shown, the processing data 110 is represented as text, and the processing data 110 includes delivery service instruction data 110A; fee data 110B; intended recipient data 110C (e.g., the addressee's new address); and delivery service identifier data 110D. Other exemplary intended recipient data could include information indicating a temporary delivery location (e.g., the addressee's vacation address), information indicating the reason why the mail piece could not be delivered, etc.

Figure 1B:
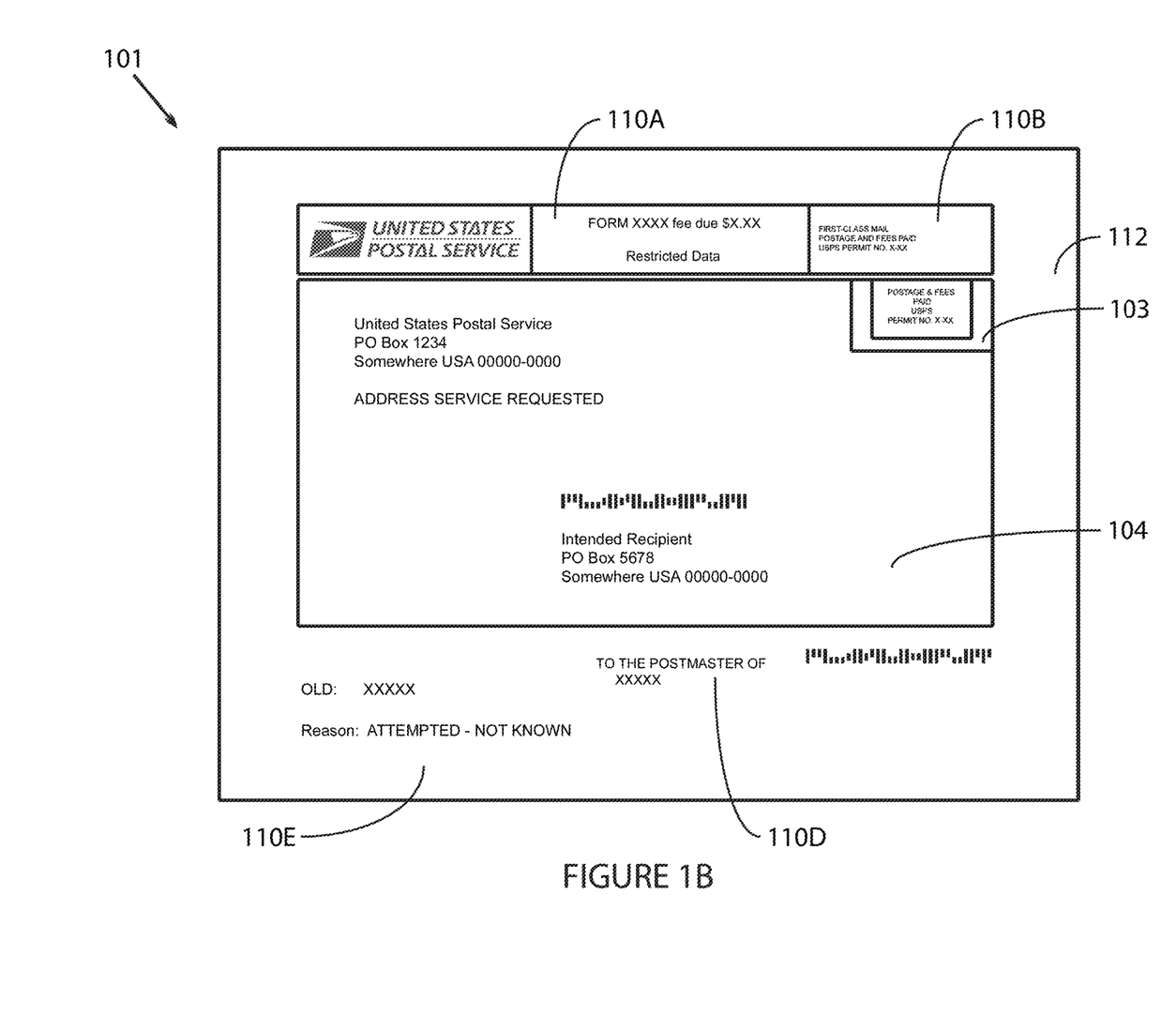
FIG. 1B is an illustration of an example of an embedded image for notifying a sender regarding a UAA delivery item (shown as a letter) that is to be sent to a return address, according to one exemplary embodiment.

Also as shown in the particular example illustrated in FIG. 1A, the embedded image may include lines to outline a template area 102, which forms a frame or border around the photo of the UAA mail piece 104, and which contains the text information 110. The embedded image may also include a postage notice area 103. In addition, in some cases, the digital photo of the UAA mail piece 104 may include a label that is on the physical mail piece as a result of UAA processing, such as a change-of-address label or an undeliverable-as-addressed label (also known as a nixie label (not shown in FIG. 1A)). The processing systems, computer readable media, and related methods of the present disclosure involve capturing images 104 of UAA mail pieces using a camera and embedding those images with appropriate processing data in certain exemplary embodiments. As an additional example, FIG. 1B shows an illustration of an example of an embedded image for notifying a sender regarding a UAA delivery item (shown as a letter) that is to be sent to a return address. As shown, embedded image 101 includes template area 112, which forms a frame or border around the photo of the UAA mail piece 104, and which contains information indicating the reason why the mail piece could not be delivered 110E in addition to other processing data as described herein.

Figure 1C:
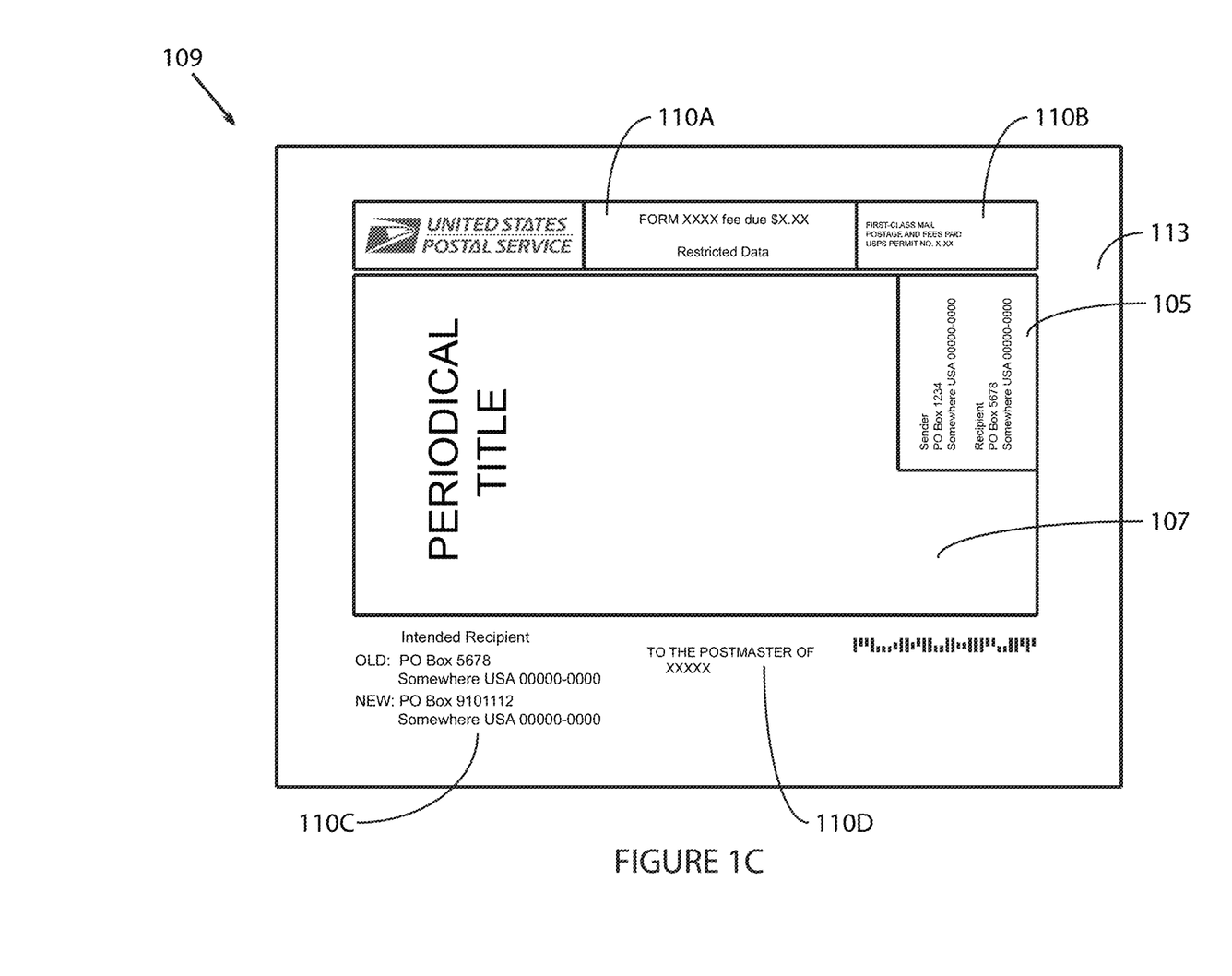
FIG. 1C is an illustration of an example of an embedded image for notifying a sender regarding a UAA delivery item (shown as a periodical) that is to be sent to a forwarding address, according to one exemplary embodiment.
Figure 1D:
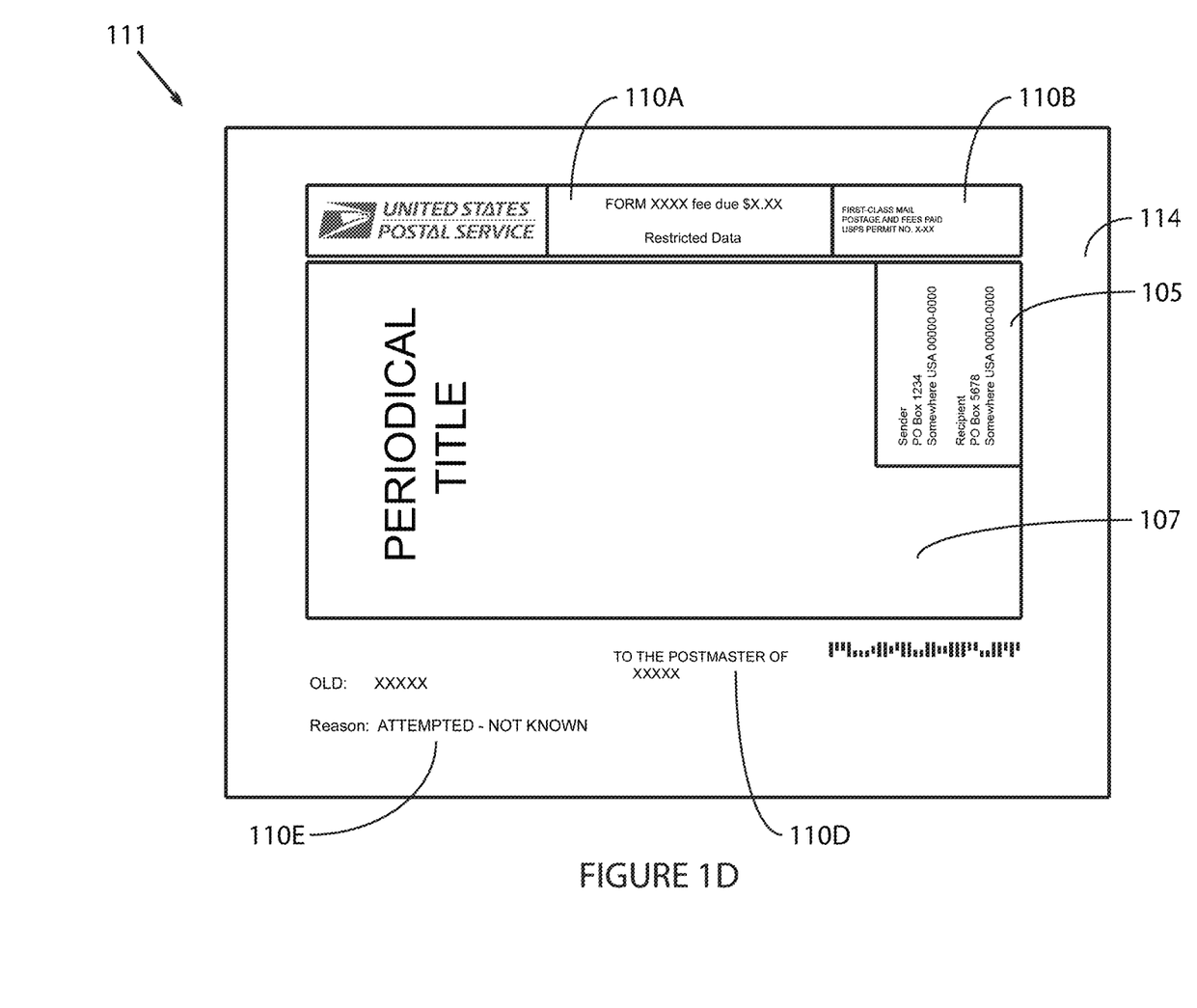
FIG. 1D is an illustration of an example of an embedded image for notifying a sender regarding a UAA delivery item (shown as a periodical) that is to be sent to a return address, according to one exemplary embodiment.

As additional examples, FIGS. 1C and D show illustrations of example embedded images for notifying a sender regarding a UAA delivery item (shown as periodicals) that are to be sent to a forwarding address or returned to the sender, respectively. More specifically, embedded image 109, in the example shown in FIG. 1C, includes template area 113, which forms a frame or border around the photo of the UAA mail piece 107 (including sender and recipient data 105), and which contains information indicating the intended recipient data 110C (e.g., the addressee's new address) in addition to other processing data as described herein. Embedded image 111, in the example shown in FIG. 1D, includes template area 114, which forms a frame or border around the photo of the UAA mail piece 107 (including sender and recipient data 105), and which contains information indicating the reason why the mail piece could not be delivered 110E in addition to other processing data as described herein.

Figure 2:
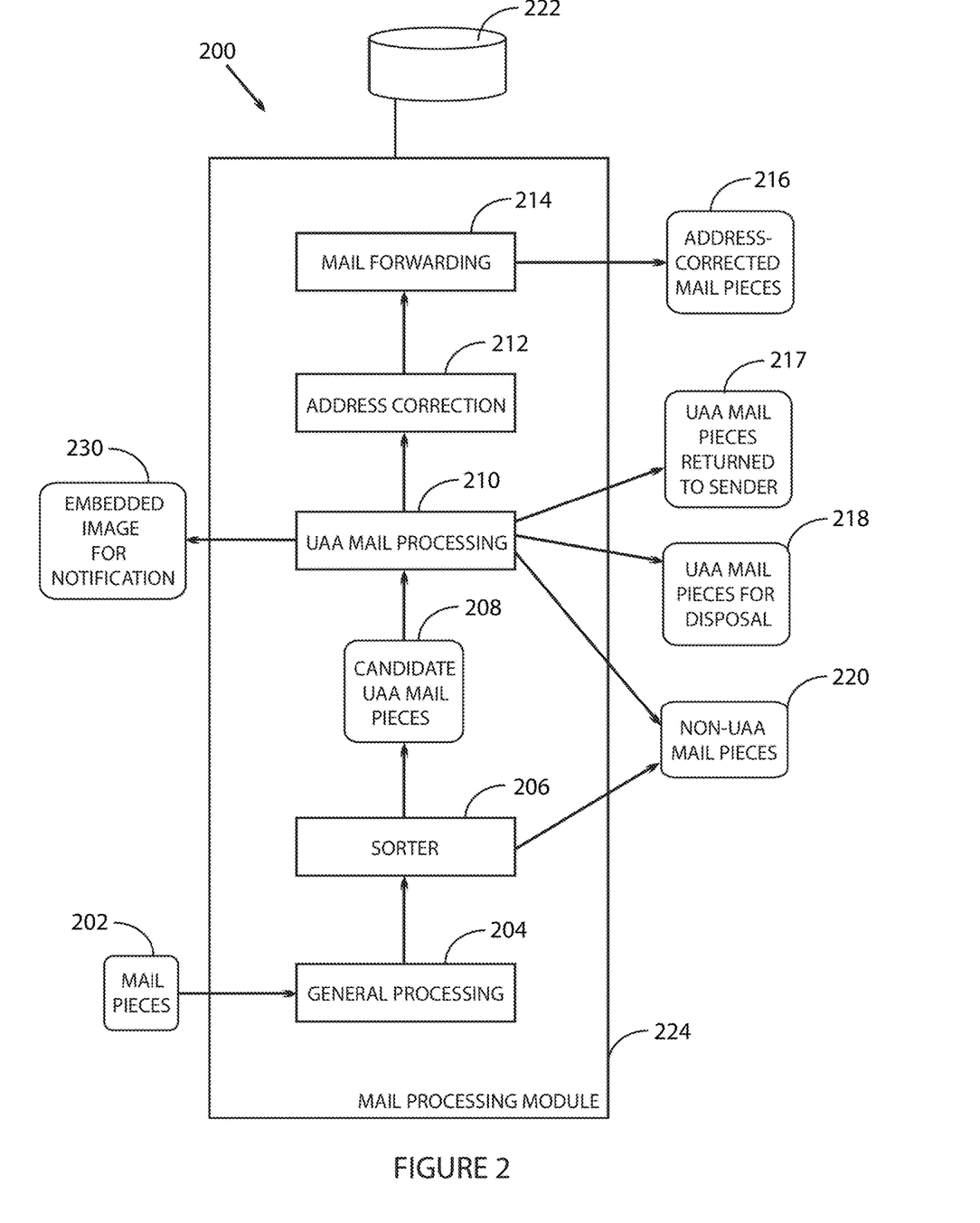
FIG. 2 is a block diagram illustrating a mail processing system according to one exemplary embodiment.

To further illustrate, FIG. 2 is a block diagram illustrating one embodiment of a mail processing system 200 for UAA mail processing. The mail processing system 200 includes mail pieces 202, a mail processing module 224, a general processing module 204, a sorting module 206, candidate UAA mail pieces 208, a UAA processing module 210, an address correction module 212, a mail forwarding module 214, address-corrected mail pieces 216, UAA mail pieces returned to sender 217, UAA mail pieces for disposal 218, non-UAA mail pieces 220, and a machine-readable (e.g., computer-readable) medium 222. The mail pieces 202 that have been inducted into the mail stream are introduced into the mail processing module 224 according to one embodiment. The mail pieces 202 include candidate UAA mail pieces 208 at this point, at the start of the processing. In one embodiment, the mail processing module 224 is a mail sorter. The mail pieces 202 are first evaluated at the general processing module 204. The mail pieces next move to the sorting module 206. The sorting module 206 may be a letter mail sorter, a flat mail sorter, a mixed mail sorter, a parcel mail sorter, or any other type of device that sorts mail pieces. The non-UAA mail pieces 220 leave the sorter 206 and the mail processing module 224 for final disposition through the mail stream.

In one embodiment, the candidate UAA mail pieces 208 are a subset of the mail pieces 202 which are initially identified or suspected to be UAA mail pieces, for example, by a delivery-service employee, such as a mail carrier. A mail piece 208 may be identified as being a UAA mail piece because the individual, family, or business to which it is addressed has moved, the address is incomplete, incorrect, or illegible, or a person, such as a mail carrier or the new person who has moved into an address, indicates that the intended recipient of a mail piece 208 is no longer present at the indicated recipient address.

The candidate UAA mail pieces 208 move from the sorting module 206 to the UAA processing module 210 or UAA module. In one embodiment, the candidate UAA mail pieces 208 are evaluated by the UAA processing module 210. For example, the UAA processing module 210 may determine that there is a valid change-of-address on file for a candidate UAA mail piece 208 (e.g., an updated or temporary deliver location for the intended recipient), and direct the mail piece 208 to address correction services. The addresses of the UAA mail pieces 208 can be corrected (e.g., changed to the updated or temporary delivery location) at the address correction module 212 in some embodiments, or, in other embodiments, at the UAA processing module 210. In some embodiments, address correction notices can also be generated at the address correction module 212 and transmitted to the mailer via the machine-readable medium 222. In another embodiment, address correction notices are generated at the UAA processing module 210 and transmitted to the mailer via the machine-readable medium 222.

In some embodiments, the address-corrected mail pieces 216 are directed to the mail forwarding module 214. In various embodiments, the mail forwarding module 214 may generate and transmit a report to the mailer indicating that a mail piece will be or has been forwarded to an updated or temporary delivery location, such as the addressee's new address or temporary vacation address. Such mail forwarding reports can include, but are not limited to, destination confirmation services. The address-corrected mail pieces 216 leave the mail forwarding module 214 for final disposition through the standard mail stream If, on the other hand, the UAA processing module 210 determines that there is not a valid change-of-address on file for a candidate UAA mail piece 208, (e.g., there is no valid forwarding address (change of address) or other updated processing information associated with the intended recipient), then the UAA processing module 210 will identify and process the mail piece 208 as a UAA item. In various embodiments, the UAA processing module 210 may generate a label or sticker that provides information regarding why the delivery item 208 is UAA, such as a USPS nixie label, and apply that label to the item. In various embodiments, the UAA processing module 210 may generate a report that indicates that the mail piece 208 is undeliverable-as-addressed and transmit the report to the mailer via the machine-readable medium 222. In some embodiments, these undeliverable-as-addressed reports are called nixie reports.

In various embodiments, the UAA mail processing module 210 may be implemented using a flats forwarding terminal (FFT) assembly, as shown in FIG. 4. In such implementations, the terminal 400 may generate the label for the UAA mail piece 208 and a delivery-service employee may apply the label by hand, especially if the UAA mail piece 208 is a parcel or a flat. As shown in the example of FIG. 2, the UAA processing module 210 may categorize the UAA mail piece 208, for example, according to an ancillary service endorsement on the mail piece 208. For instance, if the item includes a "Return Service Requested" or an "Address Service Requested" endorsement, then the UAA processing module 210 may determine that the UAA mail piece should be returned to the sender, (e.g., the mailer). The UAA mail pieces returned to sender 217 leave the UAA processing module 210 for return to the sender.

For another instance, if the item includes a "Change Service Requested" endorsement, then the UAA processing module 210 may determine that the UAA mail piece should be treated disposed of, either securely or as ordinary waste. The UAA mail pieces for disposal 218 leave the UAA processing module 210 for disposal. In some cases, some candidate UAA mail pieces 208 are found not to be UAA, because, for example, of a mistake by a mail carrier. In these cases, such misidentified candidate UAA mail pieces 208 are typically reintroduced into the delivery process as non-UAA mail pieces 220.

In various implementations consistent with the present disclosure, in addition to classifying and properly routing the candidate UAA mail pieces 208, the UAA processing module 210 may also generate an embedded image 230 for each UAA mail piece 217, 218, which is used to notify (e.g., via U.S. mail, email, etc.) the sender of each mail piece 217, 218 that the mail piece 217, 218 is UAA. In some implementations, the embedded image 230 may be in the form of the embedded image 100 illustrated in FIG. 1. In various implementations, the embedded image 230 may be generated by a computerized work station, such as the flats forwarding terminal 400 of FIG. 4.

Typically, the status of a given delivery item as being undeliverable as addressed (e.g., candidate UAA mail pieces 208) is at least tentatively identified in, for example, a general processing module 204 and/or a sorting module 206 and/or by a delivery employee, such as a mail carrier who unsuccessfully attempted to deliver a mail piece 208 as addressed. The undeliverable status of the delivery items is generally identified by determining that the delivery item includes erroneous information, for example, incorrect information about the intended recipient or the intended delivery location. For example, the erroneous information may be old, incorrect address information (e.g., the intended delivery location) for a recipient that has moved to a new address. As noted, in some cases, the undeliverable status of a delivery item is determined or identified manually (e.g., by a mail service employee). In other cases, the undeliverable status of a delivery item is determined or identified in an automated manner, for example, using a camera or barcode scanner of a general processing module 204 or of a sorting module 206 and analyzing the addressee information from the image or barcode using a database of addresses.

Figure 3:
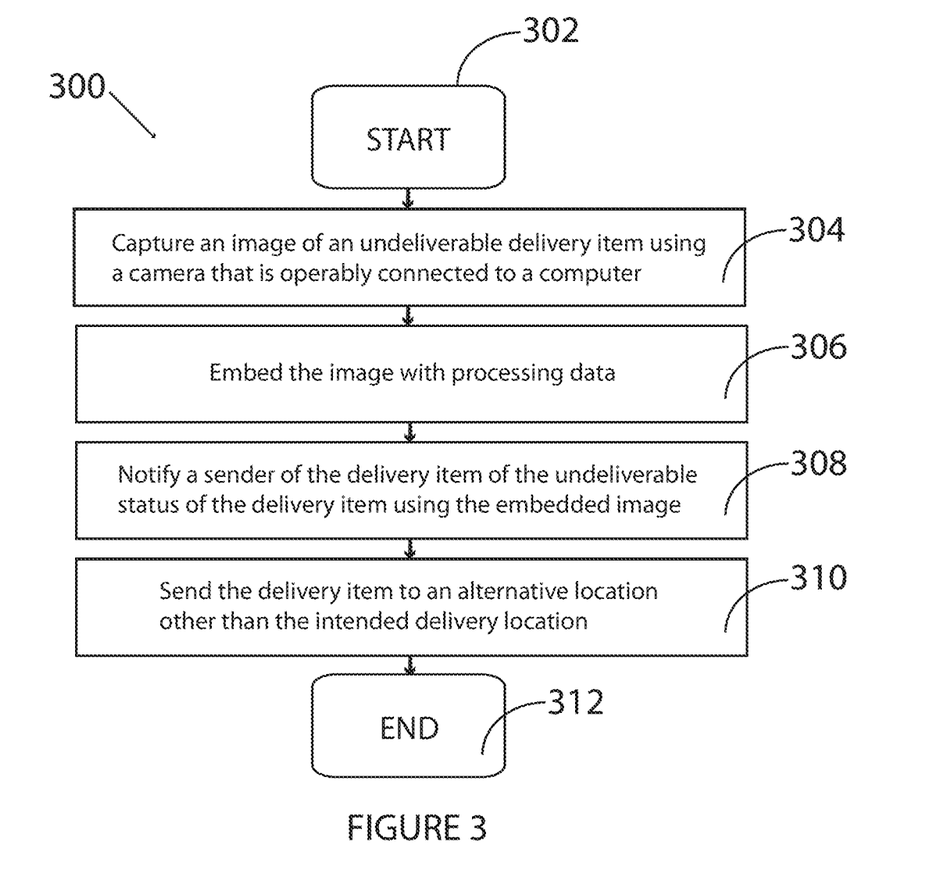
FIG. 3 is a flowchart illustrating a method of processing undeliverable delivery items according to one exemplary embodiment.

FIG. 3 provides a flowchart illustrating an example of a method 300 of processing UAA delivery items according to one exemplary embodiment. In some embodiments, the method 300 may be implemented at or by the UAA processing module 210. In some particular embodiments, the method 300 may be implemented by or using a computerized work station, such as the flats forwarding terminal 400 of FIG. 4, which may be part of the UAA processing module 210. As shown in FIG. 3, the processing method 300 starts 302 with capturing an image of the UAA delivery item or mail piece (e.g., UAA mail pieces 208, 217, 218) using a camera or the like that is operably connected to a hardware processor of a computing system, in operation 304. In various implementations, the image may be a digital image that shows a view of a side or surface of the delivery item that includes the name and address of the intended recipient (e.g., the addressee, the intended delivery location) and/or that includes a bar code and/or an ancillary service endorsement that are on the UAA delivery item and/or that includes an undeliverable-as-addressed label 105 (e.g., a nixie label) that was affixed to the delivery item.

At operation 306, the method 300 adds, includes, combines, or otherwise embeds processing data in or with the image of the delivery item to thereby generate an embedded image, which may be done using the hardware processor. In various implementations, the processing data may be or include attributes, such as mail piece classes, ancillary endorsements, participant IDs, keylines, service type identifiers (STIDs), service type codes (STCs), mailer IDs, serial numbers, reasons for UAA status (reason data, such as deceased, no mail receptacle, refused, temporarily away, vacant, addressee not known, insufficient address, no such number, no such street, unable to forward, undeliverable as addressed, unclaimed, etc.), postages due or fee data, prior addresses, new addresses, forwarding addresses, recipient names, return to sender names, return to sender addresses, delivery service instruction data, warning data, delivery service identifier data, and/or the like. In various embodiments, the embedded image may be implemented as a digital file that includes the image captured in operation 304 and the processing data. In some implementations, some or all of the processing data may be represented in the form of human-readable characters (e.g., text, letters, and numbers) representing, showing, or indicating the processing data, such as words indicating forwarding addresses, return to sender names, return to sender addresses, postages due, and/or the like. In such implementations, the embedded-image digital file may be printable file that is formatted to fit on a standard piece of paper (e.g., 8½×11 inches), such as a tagged image file format (TIFF) file, a joint photographic experts group (JPEG) file, a portable document format (PDF) file, or the like. A printed-out example of such an embedded-image digital file is shown in FIG. 1. In some implementations, some or all of the processing data may alternatively or additionally be represented in the form of digital data in the embedded image file, which data is read by a computer application that receives and processes the embedded image file, for example, at the sender's location.

The processing data can come from essentially any source. Typically, the processing data is retrieved from a barcode, QR code, or other optical, machine-readable representation of that data associated with the sender's previously stored account when the image of the undeliverable delivery item is captured in operation 304 or scanned beforehand after the delivery item is identified as undeliverable. In other exemplary embodiments, the processing data is manually input into the computer system by the delivery service based upon human-readable characters on the delivery item after it is identified as undeliverable. Moreover, the processing data can be in essentially any form including, for example, an image of a forwarding address, digital character data, optical-character-recognition output, and/or the like.

At 308, the method 300 further includes notifying a sender or mailer that sent the UAA delivery item regarding the undeliverable (UAA) status of the delivery item, using the embedded image. In some embodiments, the mailer is notified of the UAA status using a hard copy print out of the embedded image (e.g., as shown in FIG. 1), which is physically sent to the mailer (or to a proxy for the mailer, such as the postmaster of the mailer's delivery unit, in a USPS example). In other embodiments, the embedded image is electronically transmitted to the sender (e.g., via an email communication, a sender portal, or the like) to notify the sender of the UAA status of the delivery item. In various embodiments, the processing data is or includes information specifying a temporary delivery location (e.g., a post office (PO) box or the like), an updated delivery location (e.g., a new address for the intended recipient), disposal of the delivery item, or the like, and the sender of the delivery items is notified of the temporary delivery location, the updated delivery location, or other disposition for the delivery item via the processing information in the embedded image.

At operation 310, prior to ending 312, the method 300 directs the UAA delivery item to an alternative location other than the intended delivery location, such as being returned to the sender, forwarded to a corrected address (e.g., a temporary delivery location, an updated delivery location for the addressee, or the like), or disposed of as waste at a waste location, as described further herein. In some embodiments, method 300 may further include receiving payment from the sender to notify the sender and/or to send the delivery item to the temporary delivery location, the updated delivery location, or to otherwise process the delivery item sent by the sender (not shown in FIG. 3).

An exemplary flats forwarding terminal (FFT) 400 is illustrated in FIG. 4. As noted above, in some embodiments, the FFT 400 may be used to implement the UAA mail processing 210 of FIG. 2 and/or the method 300 of FIG. 3.

As shown in FIG. 4, this example of the FFT 400 includes a desk 402, and a rack or platform 404 that can hold a deliver item (e.g., a magazine or other flat) or a container of delivery items, such as a flats tub or mail tray. The FFT 400 also includes an articulating arm 412 that includes another platform or work area for holding delivery items and the like. As shown, the FFT 400 also includes a monitor 408, a keyboard 410, a barcode scanner 414, and a label printer 416, which are operably connected to a hardware processor (e.g. of a computing system(s), not shown in this view).

In addition, the FFT 400 includes a camera 406 that is positioned or positionable over the desktop or other platform or work area so as to digitally photograph delivery items, and that is operably connected to the hardware processor of a computing system (not shown in this view). The hardware processor performs methods, operations, and functions as described herein, e.g., by executing a computer program product that receives and stores the images of the delivery items (e.g., UAA mail pieces 208, 217, 218) captured by the camera 406 and adds, combines, embeds or otherwise associates relevant processing data with or into the images of the mail items to produce or generate embedded images (e.g., embedded image 230). In an example of usage, a person, such as a delivery service employee, may manually place or position the UAA item such that the surface of the item having the delivery address, return address, postage and/or label (e.g., a COA label or a nixie label) is in the camera 406's field of view. The computer of the FFT 400, or the person, may then activate the camera 406 to make, obtain, or capture a digital image of the UAA item, which the computer may embed with processing data.

As noted, the embedded images may be printed (e.g., locally or at a remote location) and sent to mailers as a hard copy (e.g., printed-out embedded image 100) in some embodiments. In other exemplary embodiments, the embedded images may be sent electronically to mailers. Either way, the captured image shows the relevant delivery item and the processing data in the embedded images notifies the mailers of the delivery items' UAA status and/or COA status, and of any addition payment for further processing the delivery item (e.g. for forwarding), and the like.

Figure 5:
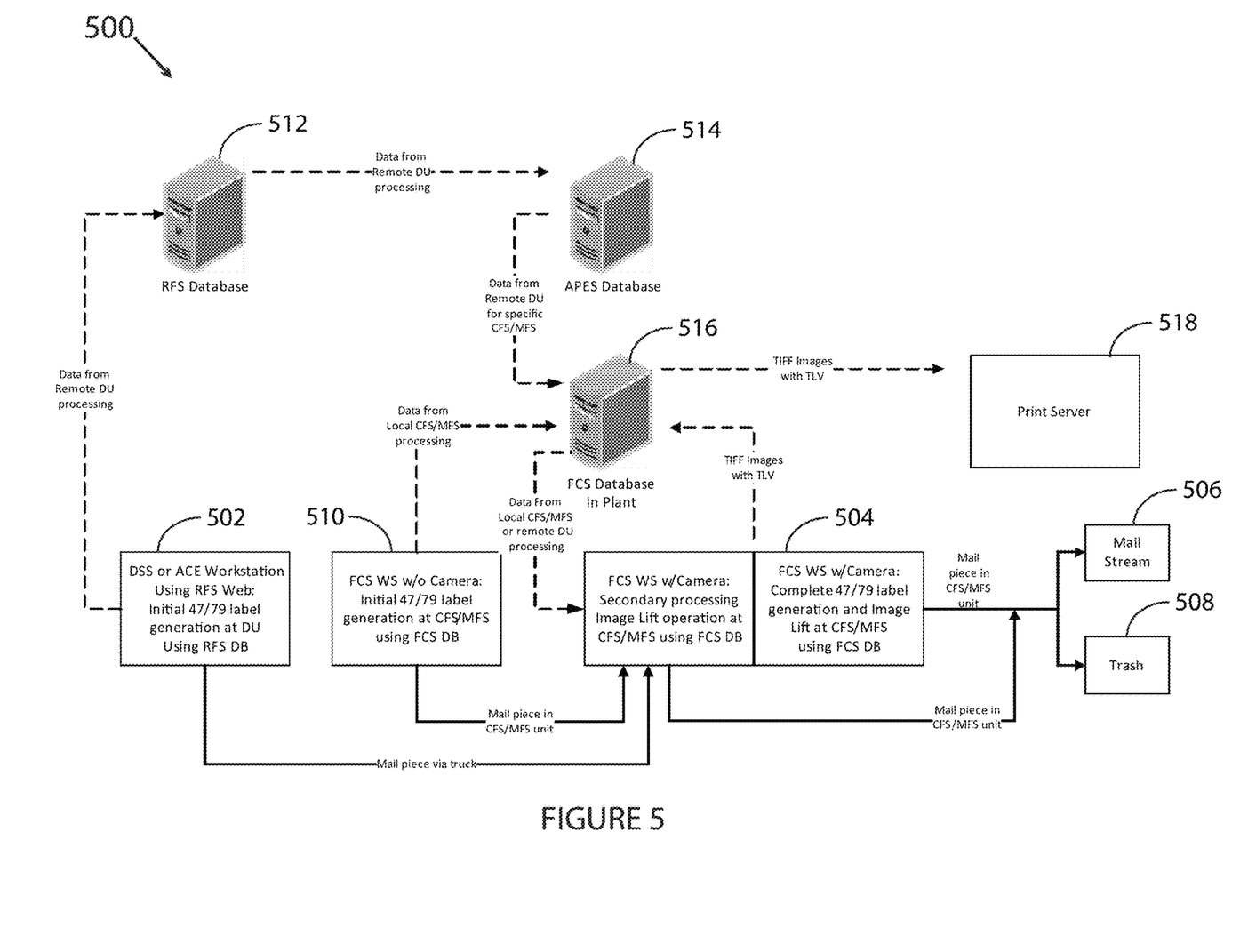
FIG. 5 is a block diagram illustrating a system that can be used in processing undeliverable delivery items according to one exemplary embodiment.

FIG. 5 is a block diagram illustrating a system that can be used in processing undeliverable (UAA) delivery items according to one exemplary embodiment, where dashed arrows schematically show the flow of data and solid arrows show the physical movement of delivery items, such as mail pieces 202, 208. As shown, the system 500 includes a Delivery Schemeless Sortation (DSS) or Advanced Computing Environment (ACE) workstation 502, which generates an initial label for a delivery item at the delivery unit (DU) using a Remote Forwarding System (RFS) web and a database. As shown, the labelled mail pieces are routed via truck to a Factory Control System (FCS) workstation (WS) 504 that includes a computerized workstation, such as the FFT 400 with a camera 406 for secondary processing, namely, an image lift operation (e.g., operation 304) and data embedding (e.g., operation 306) using a Computerized Forwarding System (CFS) and an FCS database (e.g., the contains processing data for each mail piece). The FCS WS 504 may also complete label generation for the delivery item. Once processed at FCS WS 504, e.g., as described with respect to FIG. 2 (e.g., UAA mail processing 210) and 3 above, the mail piece is sent into the conventional mail stream 506 (e.g., for return to sender or forwarding to a change of address) or to trash (waste disposal) 508. In certain instances, the mail pieces are transferred from FCS or Mail Forwarding System (MFS) WS 510 to FCS WS 504.

FCS/MFS WS 510 lacks a camera and generates an initial label at CFS using the FCS database.

As shown, data generated at the DSS or ACE workstation 502 for a given mail piece (e.g., processing data) is transmitted to the RFS database 512 and then to the APES database 514 and the FCS database 516. Data (e.g., processing data) from the FCS WS 510 is also transmitted to the FCS database 516. As also shown, embedded TIFF images of the UAA mail pieces are transmitted from the FCS WS 504, which includes FFT 400, to the FCS database 516 and data from local CFSs/MFSs or remote DUs is transmitted from the FCS database 516 to the FCS WS 504. In the embodiment shown, the embedded TIFF images of UAA mail pieces may be transferred from the FCS database 516 to a print server 518. The embedded TIFF images of UAA mail pieces are printed at print server 518 as hard copies, which are sent (e.g., mailed) to the mailers of each UAA mail piece. In some other embodiments, the embedded TIFF images may alternatively be sent electronically to the mailers.

While the foregoing disclosure has been described in some detail by way of illustration and example for purposes of clarity and understanding, it will be clear to one of ordinary skill in the art from a reading of this disclosure that various changes in form and detail can be made without departing from the true scope of the disclosure and may be practiced within the scope of the appended claims. For example, all the methods, computer readable media, delivery item processing systems, and/or component parts or other aspects thereof can be used in various combinations. All patents, patent applications, websites, other publications or documents, and the like cited herein are incorporated by reference in their entirety for all purposes to the same extent as if each individual item were specifically and individually indicated to be so incorporated by reference.

What is claimed is:

1. A processing system, comprising:
   (a) a camera that is arranged to capture an image of a delivery item; and
   (b) a hardware processor that is operably connected to the camera and that is configured to perform operations comprising:
   capturing, using the camera, an image of a delivery item that is undeliverable to an intended recipient or at an intended delivery location, where the image includes an address of the intended recipient;
   embedding, by the hardware processor, processing data with the image of the delivery item to thereby generate an embedded image as a printable file, the embedded image including the image of the delivery item framed by a template area that includes a reason for the delivery item being undeliverable; and
   notifying a proxy of a sender of the delivery item, via a hard copy printout of the embedded image, that the delivery item is undeliverable.

2. The processing system of claim 1, wherein the capturing, using the camera, the image of the delivery item that is undeliverable comprises activating the camera after the delivery item is manually positioned to face the camera.

3. The processing system of claim 1, wherein the processing data comprises one of temporary delivery location information or updated delivery location information included in the template area.

4. The processing system of claim 1, further comprising electronically transmitting the embedded image to the sender.

5. The processing system of claim 1, further comprising:
   a printer that is operably connected to the hardware processor; and
   wherein the operations further comprise:
   printing, by the printer, the printable file to generate the hard copy printout of the embedded image.

6. A computer-readable, non-transitory storage medium storing instructions that, when executed by a hardware processor of a computing system, cause the hardware processor to execute a method of processing a delivery item, the method comprising:
   capturing an image of a delivery item received from a camera that is operably connected to the computing system, wherein the delivery item is at least one of undeliverable to an intended recipient or undeliverable at an intended delivery location, where the image includes an address of the intended recipient;
   embedding, by the hardware processor, processing data with the image of the delivery item to thereby generate an embedded image as a printable file, the embedded image including the image of the delivery item framed by a template area that includes a reason for the delivery item being undeliverable; and
   notifying a proxy of a sender of the delivery item, via a hard copy printout of the embedded image, that the delivery item is undeliverable.

7. The computer-readable, non-transitory storage medium of claim 6, wherein the capturing the image of the delivery item received from the camera comprises activating the camera after the delivery item is manually positioned to face the camera.

8. The computer-readable, non-transitory storage medium of claim 6, wherein the method further comprises printing the printable file via a printer that is operably connected to the hardware processor to generate the hard copy printout of the embedded image.

9. The computer-readable, non-transitory storage medium of claim 6, wherein the method further comprises electronically transmitting the embedded image to the sender.

10. The computer-readable, non-transitory storage medium of claim 9, wherein the processing data comprises one of temporary delivery location information or updated delivery location information included in the template area.

11. A method of processing a delivery item using a processing station comprising a computer and a camera that is operably connected to the computer, the method comprising:
    capturing an image of the delivery item with the camera, wherein the delivery item is at least one of undeliverable to an intended recipient or undeliverable at an intended delivery location;
    embedding, by the computer, processing data with the image of the delivery item to thereby generate an embedded image as a printable file, the embedded image including the image of the delivery item framed by a template area that includes a reason for the delivery item being undeliverable;
    notifying a proxy of a sender of the delivery item, via a hard copy printout of the embedded image, that the delivery item is undeliverable; and
    directing the delivery item to an alternative location other than the intended delivery location.

12. The method of claim 11, wherein the capturing the image of the delivery item with the camera comprises activating the camera after the delivery item is manually positioned to face the camera.

13. The method of claim 11, further comprising identifying that the delivery item is undeliverable as addressed.

14. The method of claim 13, wherein the identifying that the delivery item is undeliverable as addressed comprises identifying that an address on the delivery item is erroneous.

15. The method of claim 13, wherein the identifying that the delivery item is undeliverable as addressed comprises determining that the image of the delivery item includes erroneous information about at least one of the intended recipient or the intended delivery location.

16. The method of claim 11, further comprising printing the printable file to thereby generate the hard copy printout of the embedded image.

17. The method of claim 11, wherein the alternative location comprises a location from a group consisting of: a waste location, a temporary delivery location, or an updated delivery location.

18. The method of claim 17, further comprising notifying the sender of the temporary delivery location or the updated delivery location.

* * * * *